March 22, 1932.   O. F. FINCH   1,850,834
TRANSMISSION
Filed Jan. 10, 1929    3 Sheets-Sheet 3
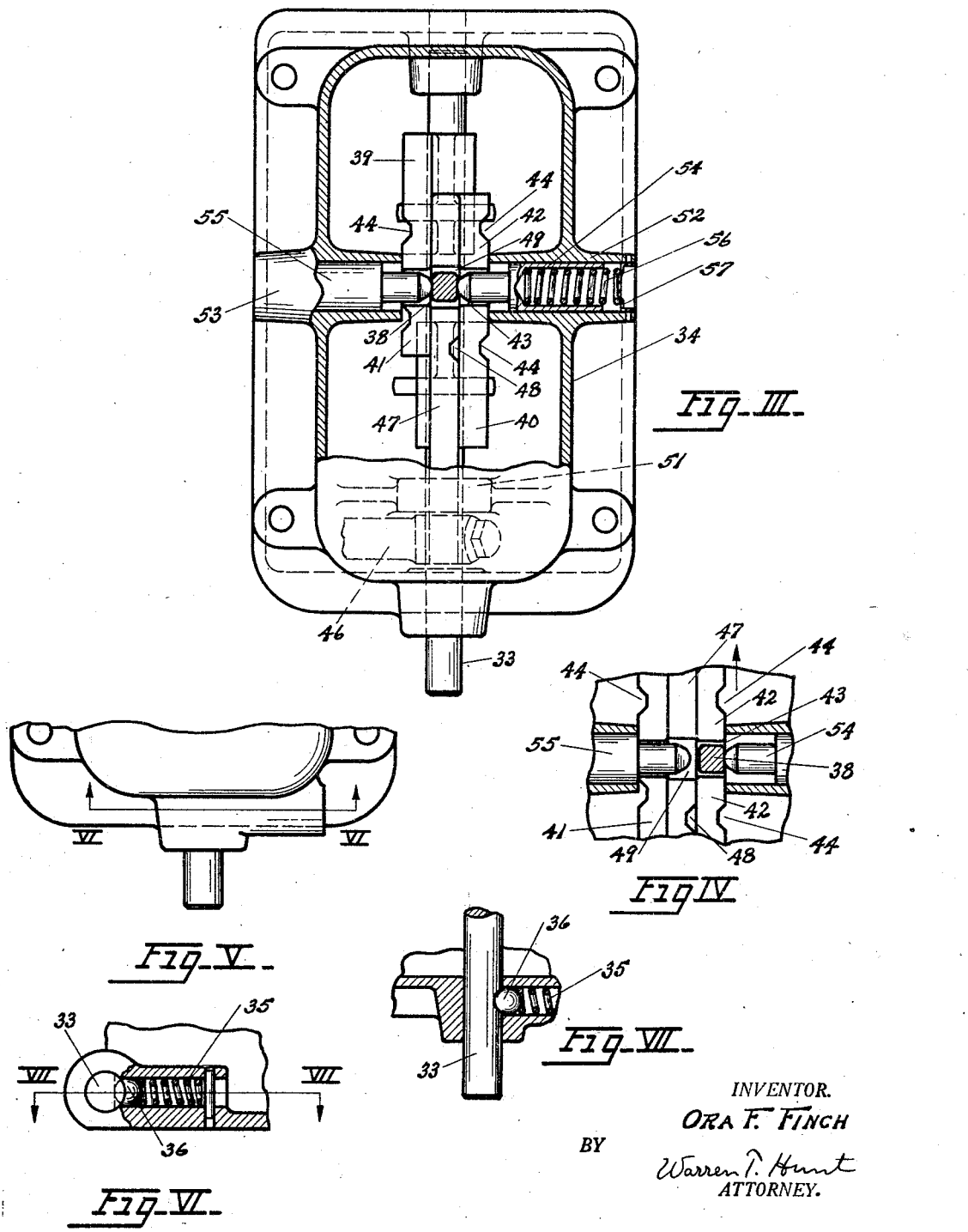
INVENTOR.
ORA F. FINCH
BY
Warren T. Hunt
ATTORNEY.

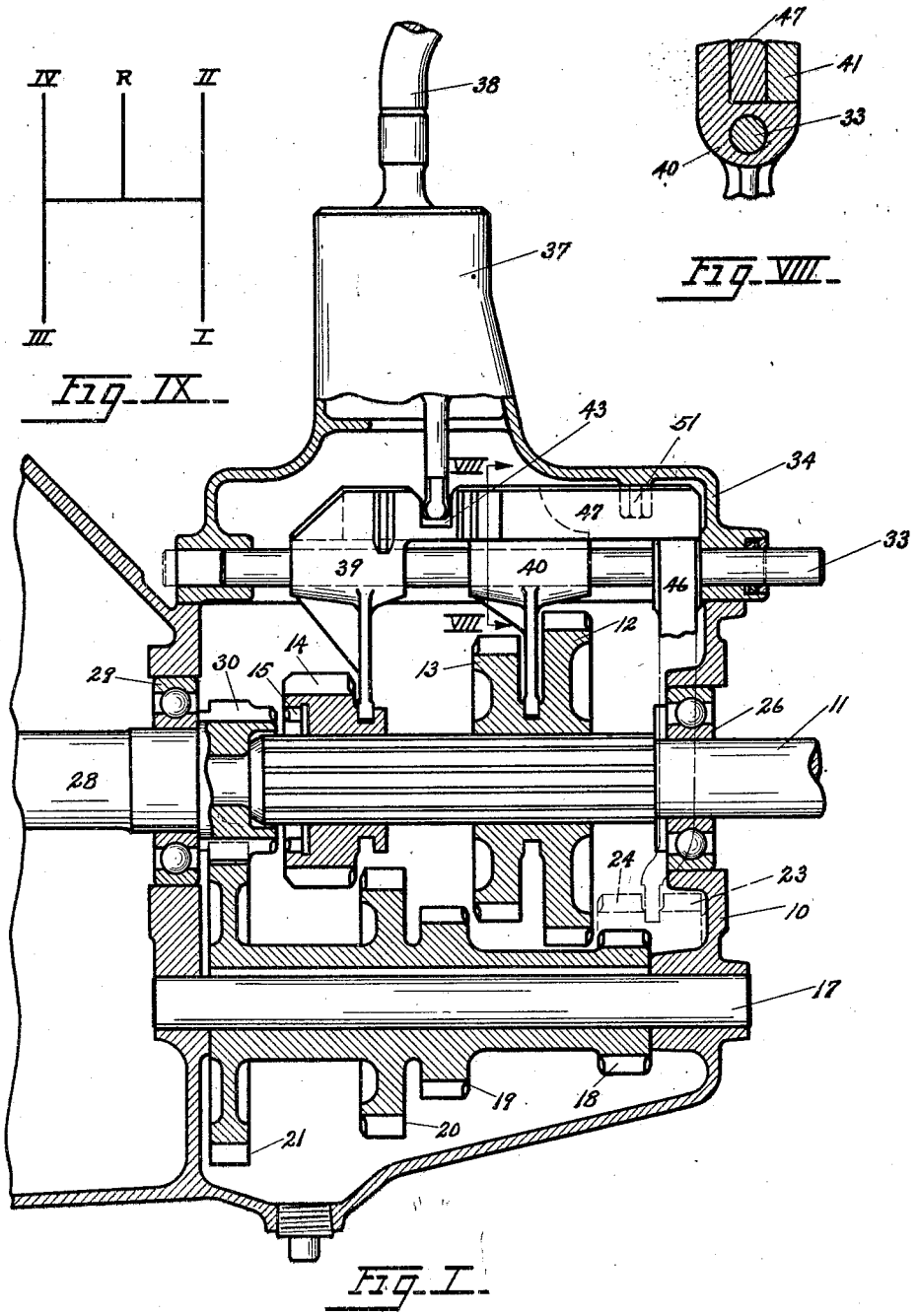

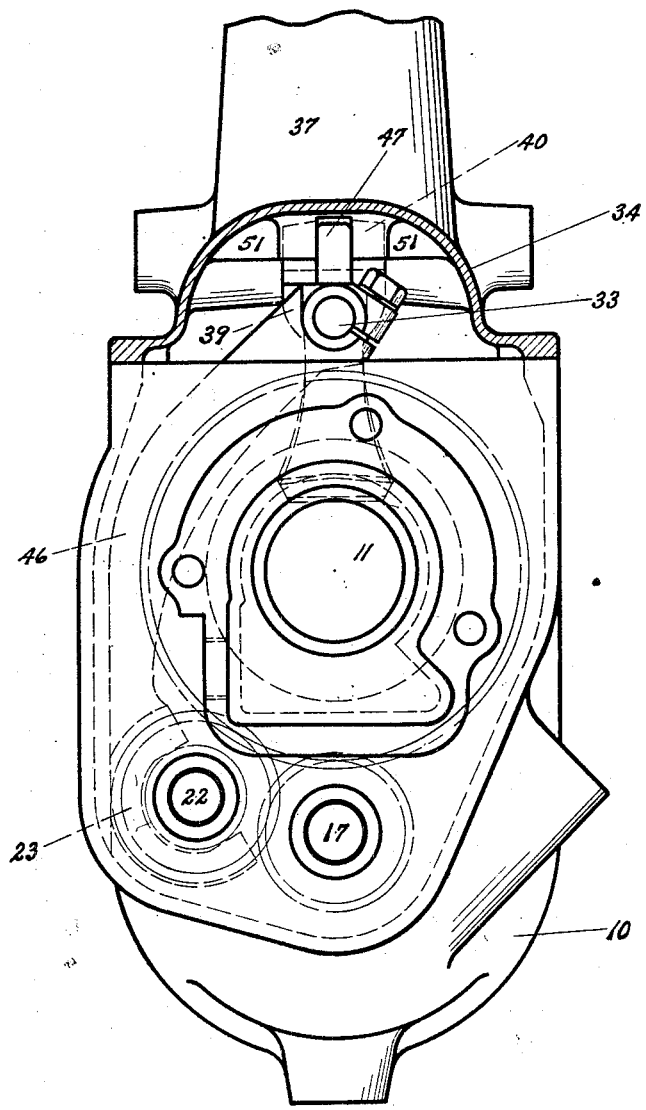

Patented Mar. 22, 1932

1,850,834

UNITED STATES PATENT OFFICE

ORA FREEMONT FINCH, OF TOLEDO, OHIO, ASSIGNOR TO THE WILLYS-OVERLAND COMPANY, OF TOLEDO, OHIO, A CORPORATION OF OHIO

TRANSMISSION

Application filed January 10, 1929. Serial No. 331,612.

My invention relates to transmissions such as are commonly employed on automobiles, and it is particularly adaptable to transmissions of the so-called four-speed type.

One of the principal objects of my invention is to simplify the gear shift mechanism by which the slidable gears are maintained in a locked position.

It is a further object of my invention to provide a gear shift mechanism of reduced number of parts which may be assembled with more compactness than has been possible heretofore.

It is a further object of the invention to reduce the cost of transmission by simplification and elimination of parts, as well as the reduction in labor costs.

The invention likewise contemplates a structure which is capable of improved operation and which, by reason of its simplicity, is capable of prolonged uninterrupted service.

These objects, together with other objects and advantages will become more apparent from a consideration of the drawings and description specifically related thereto.

Figure I is a sectional view illustrating an embodiment of my invention which may be preferred.

Fig. II is an end view of the structure illustrated in Figure I.

Fig. III is a plan view, partly in section, of the structure illustrated in Figure I.

Fig. IV is a detailed fragmentary view, partly in section, illustrating the relation of the locking means when the gear shift lever is moved out of its neutral position.

Fig. V is a fragmentary plan view of the structure shown in Fig. III embodying a modified form of locating means.

Fig. VI is a sectional view taken along the line VI—VI in Fig. V.

Fig. VII is a detailed view of a segment of the supporting shaft taken substantially along the line VII—VII in Fig. VI.

Fig. VIII is a sectional view taken along the line VIII—VIII in Figure I; and,

Fig. IX is a gear shift diagram of the transmission which is illustrated.

While the major features of the invention are contained in the gear actuating mechanism of the transmission, the gear structure has been illustrated to set forth more clearly the relationship which the invention bears to the assorted elements of the transmission. Thus, there is provided a transmission housing 10 wherein there is journaled a main shaft 11 upon which there are mounted a pair of integral spur gears 12 and 13 and a single spur gear 14 provided with an internally geared clutch portion 15. Directly below the main shaft is a counter shaft 17 on which there is rotatably mounted an integral gear assembly consisting of four spur gears, 18, 19, 20 and 21. Laterally of the counter shaft an auxiliary shaft 22 is journaled in the housing on which an integral pair of gears 23 and 24 are slidably mounted.

One end of the main shaft 11 is journaled in a bearing 26 which is mounted in the housing. The other end thereof is rotatably mounted in the hollowed end of a stub shaft 28 which is itself rotatably mounted in a bearing 29 that is fitted in the housing. A gear 30 is formed integrally with the hollowed end of the shaft one portion of which is in constant mesh with gear 21, the other portion being slidably engaged by clutch 15.

By referring to Figure I and the diagram illustrated in Fig. IX, it will be apparent that when gear 12 is shifted into engagement with gear 18 on the counter shaft, the greatest speed reduction will be had; by shifting the gear 13 into engagement with its mating gear 19 the second lowest speed reduction will obtain. By sliding gear 14 into engagement with gear 20 on the counter shaft the device will operate on its next highest speed and by shifting the gear 14 in the opposite direction whereby the internal clutch 15 will mesh with the gear 30 on the shaft 28, a direct drive is obtained. The reverse direction of drive is realized by shifting the gears 23 and 24 mounted on the auxiliary shaft 22, whereby they will interconnect gears 18 and 12.

In order to shift the gears in the manner indicated, I have provided a single supporting shaft 33 directly above the main shaft which is slidably mounted at either end in bosses formed integrally with a cover plate 34 which constitutes a portion of the housing. The cover plate may be secured to the housing in any manner whereby it forms an integral unit therewith. At one end of the bossed portion, according to the modification illustrated in Figs. V to VII, a horizontal tapped opening accommodates a spring 35 which maintains a detent 36 firmly against the shaft and the shaft, in turn, is provided with a grooved portion to serve as a locating means for the shaft. The cover plate is formed with a raised portion 37 to accommodate a gear shift lever 38 which is universally mounted therein in the conventional manner. The lower extremity of the lever extends downwardly proximate the shaft 33. A pair of symmetrical forked bossed members 39 and 40 are slidably mounted on the shaft. Each is provided with a horizontal arm portion 41 and 42 which extend in the direction of the other forked member and are spaced with respect to themselves and the shaft 33. The forked portions engage recesses provided therefor in the slidable gear units 14 and 12 respectively. On the exposed side of each arm there is formed a recess 43 and grooves 44.

A bossed forked member 46 is clamped securely to the shaft immediately above the reverse gears 23 and 24, the forked portion thereof being positioned to engage the gears in the conventional manner. An arm 47 is formed integrally with the bossed portion which extends horizontally above the shaft and between the arms of the pair of forked members. The arm is provided with a locking groove 48 and a recess 49 which is in cooperative alignment with the recesses formed on the other two arms. An aligned relationship between the arm 47 and arms 41 and 42 is assured by a pair of guide members 51 which are formed integrally with the cover 34 and extend downwardly to engage the exposed lateral portions of the arm. A pair of mating bosses 52 and 53 are likewise formed integrally with the cover immediately adjacent the recesses formed in the arm members for aligning arms 41 and 42. Within the bosses shouldered pin members 54 and 55 are slidably disposed, which are urged inwardly into engagement with the lever 38 by a coil spring 56 that is maintained in the boss by a cap 57.

To operate the device, for example, to shift the gears into second speed position, the lever 38 is pivoted manually into the position illustrated in Fig. IV whereby the pin 55 is urged inwardly by its spring until the shoulder engages the arm 41 and the extremity of the pin extends into the recess 49 formed in the arm. Simultaneously pin 54 is pressed outwardly by the lever until it escapes the arm 42 after which the lever is shifted in the direction indicated by the arrow until the pin 54 slides into the groove 44. The gear 13 will have thus been moved forwardly until it is in operative engagement with the gear 19 on the shaft 17. It will be noted that under these conditions, the arms 41 and 47 are positively locked and the gears are, therefore, likewise locked.

In order to shift the device into reverse operating position from the neutral position as illustrated in Fig. III, the lever is pulled directly back whereby the arm 47 is shifted forwardly. The pair of forked members, being slidably mounted on the shaft and locked in position by the pins 54 and 55, do not move, whereas the reverse gear fork is free to move. The lever is shifted until the pin 54 engages the groove 48 formed in the arm in a manner similar to the forward drive positions. When the modified locking means is employed, which is illustrated in Figs. V to VII, the bossed fork is secured firmly to the rod and is secured in reverse position when the detent 36 is forced into engagement with the groove formed therefor in the shaft 33. It will be noted that in the embodiment shown in Fig. III boss 46 need not be locked to the shaft 33, although preferably the fork is so constructed.

By practicing my invention one is enabled to simplify the gear shift structure, as well as to reduce the number of parts that have been employed heretofore. This simplification and reduction in number of parts affords not only a marked saving in cost of material and labor but improves upon the operation of the device.

Although I have illustrated but a single embodiment it will be apparent that the invention is susceptible to many embodiments without departing from the spirit thereof and I desire, therefore, that it be limited only as indicated in the appended claims.

I claim:

1. In a transmission of the class described having a plurality of slidably mounted gears, means for actuating the sliding gears comprising a slidable support member, means freely mounted on the support member for engaging certain of the gears and adapted to actuate the same, and means rigidly secured to the slidable support member for engaging other of the gears and adapted to actuate said other of the gears.

2. In a transmission of the class described having a plurality of slidable gears and a universally mounted gear shift lever, a slidably mounted support member, means controlled by the lever and slidable on the support member for engaging certain of the gears, and means rigidly fixed to the support member likewise actuated by the lever and adapted to engage and actuate other of the gears.

3. In a transmission of the class described having a plurality of slidable gears and a universally mounted gear shift lever, a slidably mounted support member, and a plurality of gear engaging means mounted on the support member for actuating individual slidable gears one of said gear engaging means being rigidly secured to the slidable support member.

4. In a transmission of the class described having a plurality of slidable gears and a universally mounted gear shift lever, a slidably mounted support member, and a plurality of independently operated gear engaging means mounted on the support member for actuating individual gears one of the said actuating members being permanently fixed to the shaft.

5. In a transmission of the class described a combination of a plurality of slidable gears, an axially slidable shaft, a pair of actuating members having journaled portions slidably mounted on the shaft, a third actuating member fixed securely to the slidable shaft, a manually operated lever engageable with the members and adapted to actuate the same individually.

6. In a transmission of the class described a gear operating control comprising a universally mounted lever, a slidably mounted shaft, a pair of similar gear engaging members slidably disposed on the shaft each having horizontal arm portions above said shaft, and a third gear engaging member fixed securely to the shaft having an integral arm portion disposed between the horizontal arm portions of the other gear engaging members.

7. In a four-speed transmission a gear shift mechanism comprising a universally mounted lever, a horizontally disposed axially slidable shaft, a pair of gear-engaging members slidably disposed on the shaft, a third gear engaging member rigidly secured to the shaft, and means co-operatively disposed with respect to the members, whereby two of the members are maintained in a locked position at all times.

8. In a transmission of the class described having a plurality of slidable gears, a universally mounted gear shift rod, a slidably mounted support member, a pair of gear actuating members slidably mounted on the support member provided with horizontal arms spaced with respect to each other and having recesses formed therein, a third gear engaging member rigidly secured to the support member and movable therewith having an arm portion disposed between the arm portions of the pair of gear engaging members, means co-operatively disposed with respect to the gear shift lever and grooved arms whereby two of the arms are at all times maintained in a locked position.

9. In a transmission of the class described, including a plurality of slidably mounted gears, a gear shift mechanism including a universally mounted shift lever, a shaft member disposed between the gears and the lever, a pair of gear engaging members slidably mounted on the support co-operatively disposed with respect to the lever and adapted to actuate the gears, horizontal arms formed integrally with the members spaced laterally of each other, each of said arms being provided with a recess and grooves spaced with respect to the recesses, a third gear engaging member likewise mounted on the shaft and supported thereby adapted to actuate another gear said third member having an arm disposed horizontally between the arms of the pair of members said arm having a recess and a groove spaced with respect to the recess formed therein, a pair of shouldered locking plungers mounted on the opposite sides of the arms adapted to lock two of the arms in position by engaging the recesses and to fix the position of the other arm by engaging the groove formed therein.

10. In a transmission of the class described a gear shift mechanism including a slidable supporting shaft, a pair of gear engaging members mounted thereon, each of said members being provided with a groove and recesses spaced with respect to the groove, a third member secured to the shaft having a groove and spaced recesses co-operatively disposed with respect to the recesses, and grooves formed in the pair of members, a resiliently mounted locking plunger adapted to maintain two of the members in a locked position at any time and co-operative with the recesses formed in the other of the three members.

11. In a transmission of the class described, a gear shift mechanism including a slidable supporting shaft, a pair of gear engaging members slidably supported on the shaft and provided with horizontally spaced arms, said arms being provided with recesses and grooves spaced from the recesses, a third gear engaging member mounted on and movable with the supporting shaft and having a horizontally disposed arm said arm having a recess and a groove co-operatively disposed with respect to the groove formed in the adjacent arm, a gear shift lever co-operatively disposed with respect to the arms, and resiliently disposed means adapted to engage the recesses in two of the arms at any time and to engage the groove in the third arm.

12. In a transmission of the class described, a gear shift mechanism including a movable supporting shaft; a plurality of gear engaging members slidably mounted upon said shaft, another gear engaging member fixed to said shaft and movable therewith, each of said members being formed with a slot; means whereby said members may be selectively moved to bring said slots into and out of registration; and a plurality of locking means engageable with the slots in said members whereby only one of said members may be positively moved from local position.

In testimony whereof, I affix my signature.

ORA F. FINCH.